Oct. 5, 1965

G. FELDSTEIN 3,209,887

TRAY POSITIONING DEVICE

Filed May 31, 1963

INVENTOR
GEORGE FELDSTEIN

ATTORNEY

Oct. 5, 1965  G. FELDSTEIN  3,209,887
TRAY POSITIONING DEVICE
Filed May 31, 1963  2 Sheets-Sheet 2
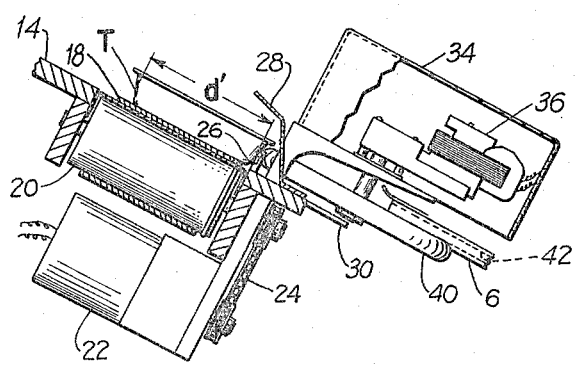
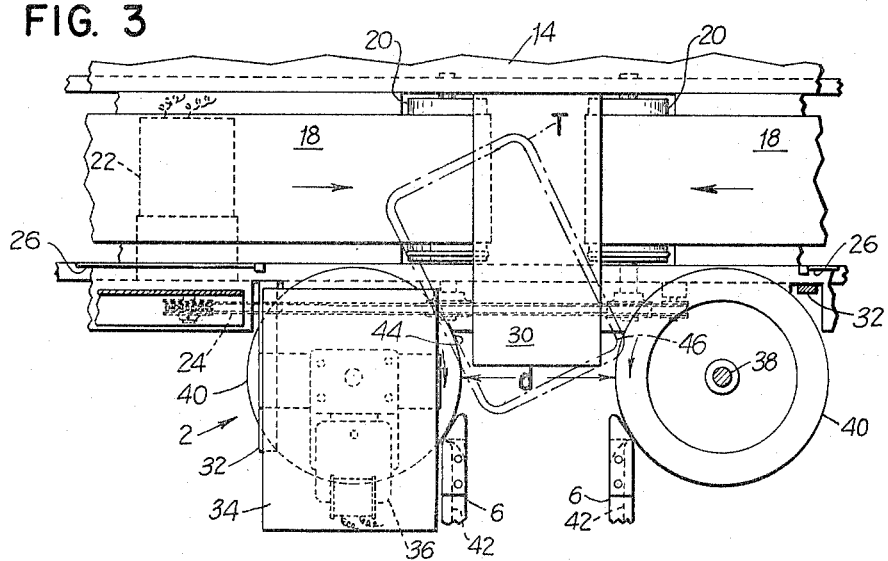
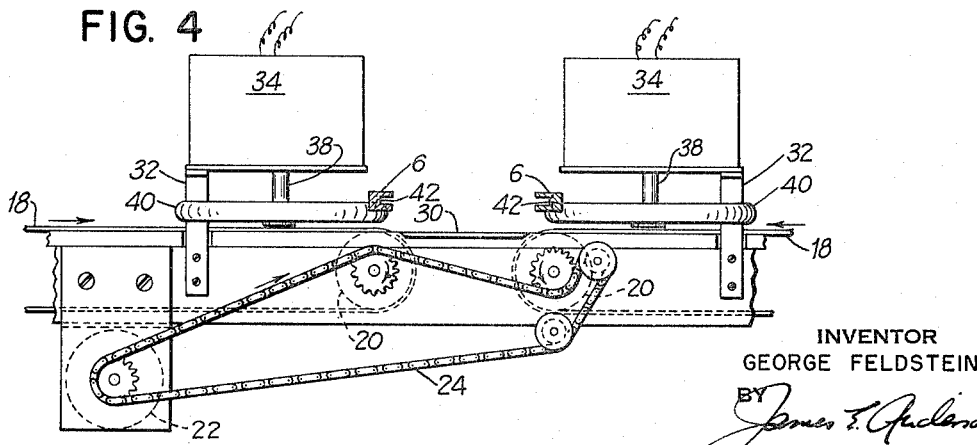
INVENTOR
GEORGE FELDSTEIN
ATTORNEY

United States Patent Office 3,209,887
Patented Oct. 5, 1965

3,209,887
TRAY POSITIONING DEVICE
George Feldstein, Fairfield, Conn., assignor to American Machine & Foundry Company, a corporation of New Jersey
Filed May 31, 1963, Ser. No. 284,409
12 Claims. (Cl. 198—25)

This invention relates to an arrangement of means adapted to receive a tray or the like and properly align the same while advancing it into a device for further handling.

This application is related to the copending application of Pollak and Tiedemann, Serial No. 285,746, filed June 5, 1963, and entitled "Tray Dumping Mechanism." In that application there is disclosed a device comprising essentially a pair of spaced, parallel arms adapted to grasp the edges of a tray and overturn it to empty the contents, and thereafter to discard the tray at a separate location. In the actual environment or system for which such a device was specifically developed, the trays contain individual portions of food which are dropped into a rotary deep fat frying apparatus. The previously mentioned arms have inwardly facing channels or grooves which hold the flanged edges of a tray, and it is necessary to align the edges of the tray with these grooves as it is being introduced therein.

It is the principal object of this invention to provide an arrangement of means for receiving trays delivered from different locations, and to properly align the edges of each tray while advancing it into a further handling device such as disclosed in the copending application identified above.

In accordance with the specifically disclosed embodiment of this invention, there is provided a pair of counter-rotating wheels spaced apart by a distance approximating the width of the trays being handled. These wheels are located between and acts in cooperation with conveyor means for delivering the trays and a further handling device of the type previously mentioned. As a tray enters between the wheels in skew relation to the desired line of advancement it is immediately turned and brought into line by the particular cooperative action of these wheels.

Further objects, advantages and details of this invention will become apparent from the following description when read in conjunction with the accompanying drawings in which:

FIGURE 2 is a vertical section taken as indicated by lines 2—2 in FIGURE 1;

FIGURE 3 is a plan view of the structure shown in FIGURE 2; and

FIGURE 4 is a view looking from the side of the structure at lower portion of FIGURE 3.

Figure 1:
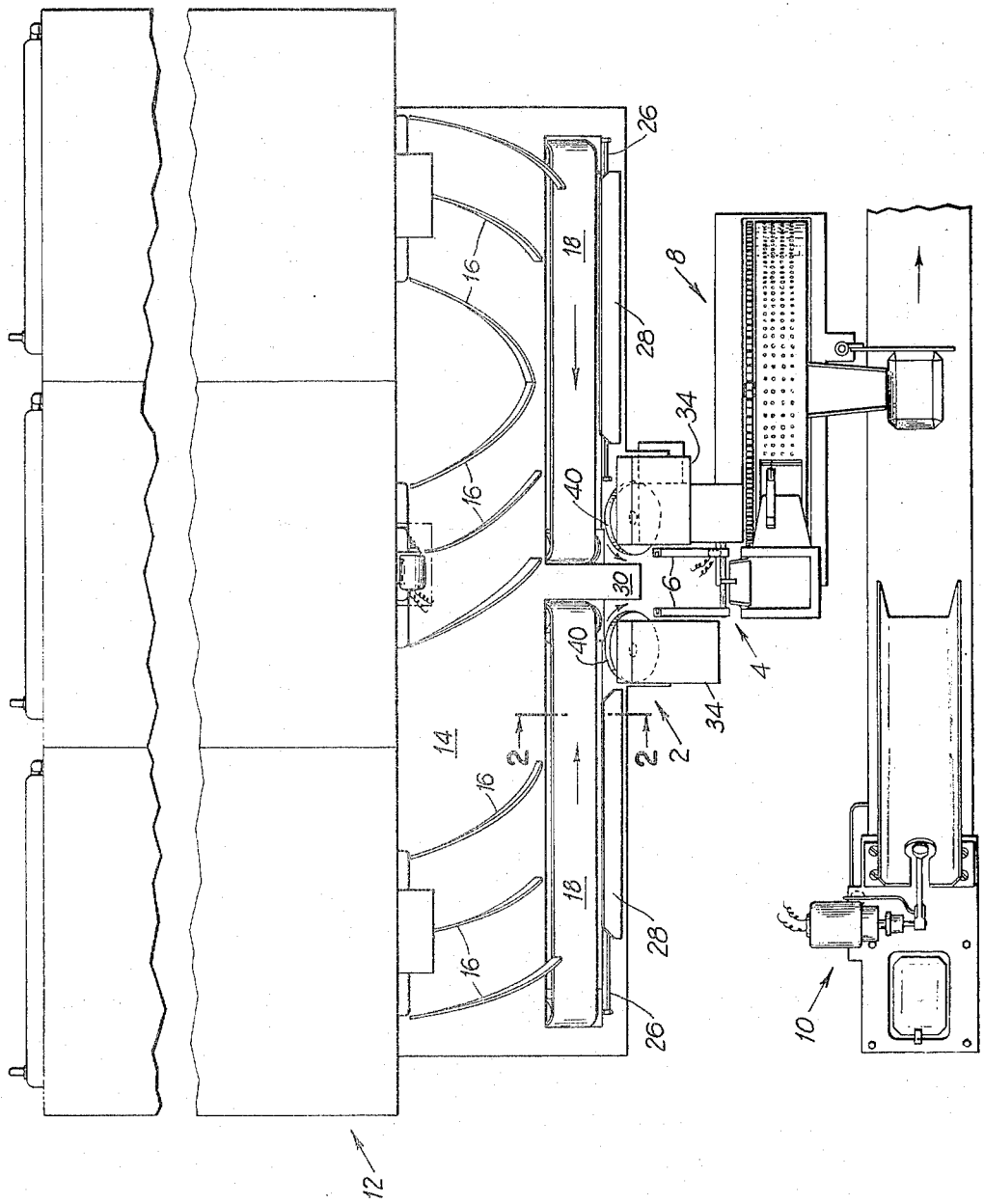
FIGURE 1 is a plan view of a complete automated system in which tray positioning means in accordance with this invention is employed in connection with the storage, dispensing and cooking of foods.

This invention is applicable in general to the positioning of articles having a configuration comparable to that of a food pan or tray, but will be briefly described as shown in FIGURE 1 in combination with a fully automated system for handling and cooking foods. The mechanism on which interest is focused for purposes of the present application is generally indicated at 2, and is adapted to function with containers that may be regarded as "Pans" or "Trays," and which may be formed of materials such as paper stock, metal or plastic. These containers will be referred to herein as "Trays" and are indicated as T. The principal function of mechanism 2 is to position each successively delivered tray with its sides and direction of advancement in alignment with a device 4 comprising essentially a pair of spaced, parallel arms 6 adapted to grasp edges of the tray while overturning it above rotary deep fat frying apparatus generally indicated at 8. The device 4 is the subject matter of the copending application of Pollak and Tiedemann, previously identified herein, and the apparatus 8 is the subject matter of the copending application of Soussloff et al., Serial No. 83,984, filed December 22, 1961, and entitled "Rotary Compartmented Material Treating Unit." The frying apparatus 8 is adapted to cook separately a variety of foods delivered thereto and thereafter to discharge each food portion individually into a disposable tray or plate delivered to a conveyor by means of automatically operative apparatus, generally indicated at 10, forming no part of the present invention.

The supply of trays T, each containing a portion of uncooked food, is provided by a group of automatically operative storage and dispensing units 12. Upon demand, each of the units 12 dispenses an order of a particular type of food, ejecting it onto an inclined table 14 having curved guideways defined by vanes 16 which lead to a pair of converging belt conveyors 18. The belt of each conveyor travels about a pair of rollers 20, the conveyors being driven in directions converging toward each other by a motor 22 through means of a chain drive 24. As evident in FIGURE 2, the conveyors 18 are slanted toward the lower side in continuance of the slope of table 14, and the tendency of a tray T to slide laterally is limited by rails 26. Also, an elongate cover 28 at each side serves to limit any bouncing action or other unusual occurrence of trays as they emerge downwardly from the vanes 16, and to prevent incidental spilling their contents. The terminal ends of conveyors 18 are spaced, and between them, in a tangential relation to their upper surfaces, there extends a tongue or extension 30 of the table 14.

On brackets 32 rising from the table structure there are boxes 34, each of which houses an electric motor 36 having an output shaft 38 on which there is fixed a wheel 40. It will be noted that by virtue of the axes of shafts 38 being normal to the table 14 and conveyors 18, the wheels 40 are in parallel relation therewith. The surface of each of the wheels 40 preferably is characterized by a frictional gripping quality such as that of rubber. As viewed in FIGURE 3, the left wheel 40 rotates in a clockwise direction and the right wheel 40 rotates in a counter-clockwise direction.

The space $d$ between the wheels 40 is approximately the same as or slightly greater than the mean width $d'$ of a tray T. The wheels 40 are at the proper height, relative to the tongue or extension 30, to engage the sides of a tray T just below its laterally extending flanges which are to be received in channels or grooves 42 in arms 6. It is noted further that due to the vertical relationship of the grooves 42 and extension 30, there is smooth entry of these flanges directly into the grooves 42.

In the operation of this invention, either rectangular or square trays T can be handled. Assuming for purposes of description that the trays are rectangular (e.g. approximately five by seven inches), each tray will be delivered onto table 14 by one of the dispensers 12 in a lengthwise direction and will be carried by conveyors 18 with the smaller dimension or width $d'$ oriented as illustrated in FIGURE 2. Whether a tray T approaches the mechanism 2 from the left or right conveyor 18 viewed in FIGURE 3, the operation is the same in either case. In the illustrated case, FIGURE 3, the tray T is approaching mechanism 2 from the left. As the tray reaches the terminal end of the left-hand conveyor its leading edge will encounter the right-hand conveyor 18 converging from the opposite direction. This action of the right-hand conveyor, coupled with the tendency of the tray to gravitate toward the lower side of the slanted extension 30, will cause the tray be be turned inwardly, either clockwise or counterclockwise, toward the wheels 40. As illustrated in FIGURE 3 the tray has turned in a clockwise direction, and as this is occurring the left-hand wheel 40 that has been in contact with the tray side portion indicated at 44 does not attain any frictional "bite" therewith until the leading corner portion 46 encounters the right-hand wheel 40. Then, the action of this right-hand wheel 40 (as viewed in FIGURE 3) tends to snap the tray around into a position wherein the tray edges are in alignment with the arms 6, and the two wheels 40 work together in effecting straight-line advancement of the tray. It will be evident that because the dimension $d$ approximates the tray width $d'$, the tray cannot pass between the wheels 40 in any other position than this position of alignment with arms 6.

A further feature of this overall combination is that if a tray is presented to the mechanism 2 in any given position, the combined effect of the conveyors 18 and the rollers 40 will be to turn the tray around into a position wherein its length and edges are in alignment with the direction of advancement into arms 6. Thus, for example, if trays are carried by conveyors T in sidewise rather than the lengthwise manner, the mechanism 2 nevertheless will function as desired.

It will be understood that various departures from the specifically disclosed embodiment of the invention may be effected without departing from the scope thereof as defined by the following claims.

What is claimed is:

1. In combination, a device adapted to receive a rectangular or square tray or the like and to orient and deliver same with sides straight in alignment with the path of delivery for further handling, means for effecting said alignment of a tray of the like and delivery of the same for further handling, and means supplying said trays or the like to the first mentioned means, said first-mentioned means comprising a pair of spaced wheels rotating about substantially vertical axes at opposite sides of the path of delivery to said device, said wheels being driven in opposite directions wherein the left wheel rotates clockwise and the right wheel rotates counterclockwise so as to feed trays presented thereto inwardly between said wheels to effect said delivery, said wheels being spaced apart a distance approximating the width of said tray or the like.

2. In the combination according to claim 1, wherein said supplying means comprises belt conveyors converging toward a point of delivery directly opposite and adjacent said wheels and cooperating therewith to effect said alignment of a tray or the like.

3. In the combination according to claim 1, wherein said supplying means comprises at least one flat belt conveyor leading toward a point of delivery directly opposite and adjacent said wheels, said conveyor being laterally slanted downwardly toward said wheels, and the axes of said wheels being substantially normal to the plane of said conveyor.

4. In the combination according to claim 2, said conveyors having their convergent terminal ends in spaced relation, and including an extension member leading downwardly from between said terminal ends toward the space between said wheels for guidance and support of a tray or the like.

5. Apparatus for receiving a rectangular or square tray or the like, and orienting and advancing the same straightly into a handling device of the type having spaced members incorporating means to grasp its side edges, comprising a pair of spaced wheels rotating about substantially vertical axes and in opposite directions wherein the left wheel rotates clockwise and the right wheel rotates counterclockwise so as to feed trays presented thereto inwardly between said wheels, said wheels having a spacing approximately the same as the minimum transverse dimension of a tray or the like being handled and the corresponding dimension of said grasping means, whereby said wheels serve to advance said tray or the like into said device with its edges aligned with the direction of advancement, and means for delivering trays or the like to said wheels.

6. An apparatus according to claim 5, wherein the last-mentioned means comprises a pair of conveyors converging from opposite sides toward a delivery point directly adjacent and opposite the entrance between said wheels.

7. Apparatus according to claim 6, including a member extending from adjacent the opposed terminal ends of said conveyors toward the space between said wheels for support of a tray or the like in delivery thereto.

8. Apparatus according to claim 7, wherein said member slants downwardly toward said wheels.

9. Apparatus for properly aligning a tray or the like and delivering it to a device for further handling, comprising a pair of spaced wheels rotating about parallel, substantially vertical axes and in opposite directions to advance therebetween a tray or the like having a smaller transverse dimension which is approximately the same as the spacing between said wheels, and a pair of conveyors converging from opposite sides toward a delivery point directly opposite and adjacent the entrance to said wheels.

10. Apparatus according to claim 9, wherein said conveyors have an incline downwardly toward said entrance.

11. Apparatus according to claim 9, wherein the axes of said wheels are tilted slightly away from the vertical and said conveyors are slanted downwardly toward said wheels in substantial parallelism with the planes of rotation of said wheels.

12. Apparatus for properly aligning a tray or the like and delivering it to a device for further handling, comprising a pair of spaced wheels rotating about parallel, substantially vertical axes and in opposite directions wherein the left wheel rotates clockwise and the right wheel rotates counterclockwise so as to feed a tray presented thereto inwardly between said wheels to advance therebetween a tray or the like having when oriented a smaller transverse dimension which is approximately the same as the spacing between said wheels, and conveyor means for delivering said tray or the like into contact with said wheels.

References Cited by the Examiner
UNITED STATES PATENTS

| 2,405,805 | 8/46 | Albertoli | 198—20 |
| 2,741,356 | 4/56 | Axton | 198—20 |

SAMUEL F. COLEMAN, *Primary Examiner.*

WILLIAM B. LA BORDE, *Examiner.*